United States Patent [19]

Nayak et al.

[11] Patent Number: 5,901,008
[45] Date of Patent: May 4, 1999

[54] VOICE COIL DRIVEN POSITIONER FOR COARSE AND FINE POSITIONING OF MAGNETIC HEAD IN MULTI-TRACK TAPE DRIVE

[75] Inventors: Ashok B. Nayak, Glendora; Kurt A. Buckland, Yorba Linda; Walter Fehlmann, Fountain Valley; James Mark Decot; Scott L. Hanson, both of Costa Mesa, all of Calif.

[73] Assignee: Seagate Technology, Inc, Scotts Valley, Calif.

[21] Appl. No.: 08/828,550

[22] Filed: Mar. 31, 1997

Related U.S. Application Data

[62] Division of application No. 08/577,802, Dec. 22, 1995, which is a continuation of application No. 08/168,716, Dec. 15, 1993, abandoned.

[51] Int. Cl.[6] .................................................. G11B 5/584
[52] U.S. Cl. ..................................... 360/78.02; 360/78.12
[58] Field of Search .................................... 360/75, 77.12, 360/78.02, 78.12, 78.13; 318/12, 13, 14, 15; 324/207.18

[56] References Cited

U.S. PATENT DOCUMENTS

| | | | |
|---|---|---|---|
| 3,470,399 | 9/1969 | Johnson et al. | 310/13 |
| 3,827,081 | 7/1974 | Prieur | 360/105 |
| 4,498,023 | 2/1985 | Stout | 310/14 |
| 4,667,158 | 5/1987 | Redlich | 324/207.18 |
| 4,677,505 | 6/1987 | Nukada et al. | 360/77.12 |
| 4,679,104 | 7/1987 | Dahlerhud | 360/78.02 X |
| 4,695,907 | 9/1987 | Inaji et al. | 360/77.16 X |
| 5,091,665 | 2/1992 | Kelly | 310/14 X |
| 5,121,270 | 6/1992 | Solhjell | 360/77.02 |
| 5,191,492 | 3/1993 | Nayak et al. | 360/78.02 |
| 5,280,402 | 1/1994 | Anderson et al. | 360/106 |
| 5,371,636 | 12/1994 | Nayak et al. | 360/75 |
| 5,377,052 | 12/1994 | Guzman et al. | 360/77.12 X |
| 5,379,170 | 1/1995 | Schwarz | 360/78.02 X |
| 5,384,676 | 1/1995 | Yokoyama et al. | 360/77.13 |
| 5,434,732 | 7/1995 | Schwarz et al. | 360/78.02 X |
| 5,450,257 | 9/1995 | Tran et al. | 360/77.12 X |
| 5,457,586 | 10/1995 | Alcudia et al. | 360/77.01 |
| 5,536,983 | 7/1996 | Araki et al. | 310/12 |

FOREIGN PATENT DOCUMENTS

A-0417956   3/1991   European Pat. Off. .
62-280601   12/1987  Japan .

OTHER PUBLICATIONS

Howard M. Berlin; The Illustrated Electronics Dictionary: pp. 85–86, 1986.

Wolf, "Guide to Electronic Measurements and Laboratory Practice", ©1983, Prentice–Hall, pp. 335–338.

*Primary Examiner*—Aristotelis M. Psitos
*Assistant Examiner*—K. Wong
*Attorney, Agent, or Firm*—Fliesler, Dubb, Meyer & Lovejoy

[57] ABSTRACT

A voice coil driven positioner is provided for positioning the magnetic head of a tape drive relative to the tape of a removable tape cartridge. The head positioner includes a low-mass carriage that supports the head on one end and the voice coil on an opposed second end. A low friction guide mechanism guides the carriage along a precision movement path that carries the head across tracks of a supplied multi-track tape and simultaneously carries the voice coil through a flux field generated by a stator. A movable magnet is attached to the carriage and located within the hollow of the voice coil for reciprocating into a hollow passageway of the stator together with reciprocation of the voice coil into another hollow of the stator. A flux detector is attached to the stator and located compactly within the hollow passageway of the stator for detecting the position of the magnet. A programmable lookup table converts measurement signals output by the flux detector into pre-calibrated, head-position indicating signals. A platform is provided on the carriage for mounting an interferometer prism used during calibration.

51 Claims, 7 Drawing Sheets

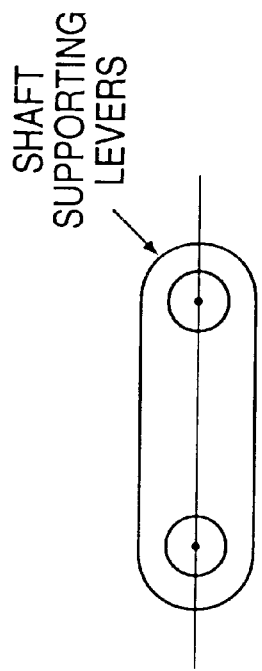
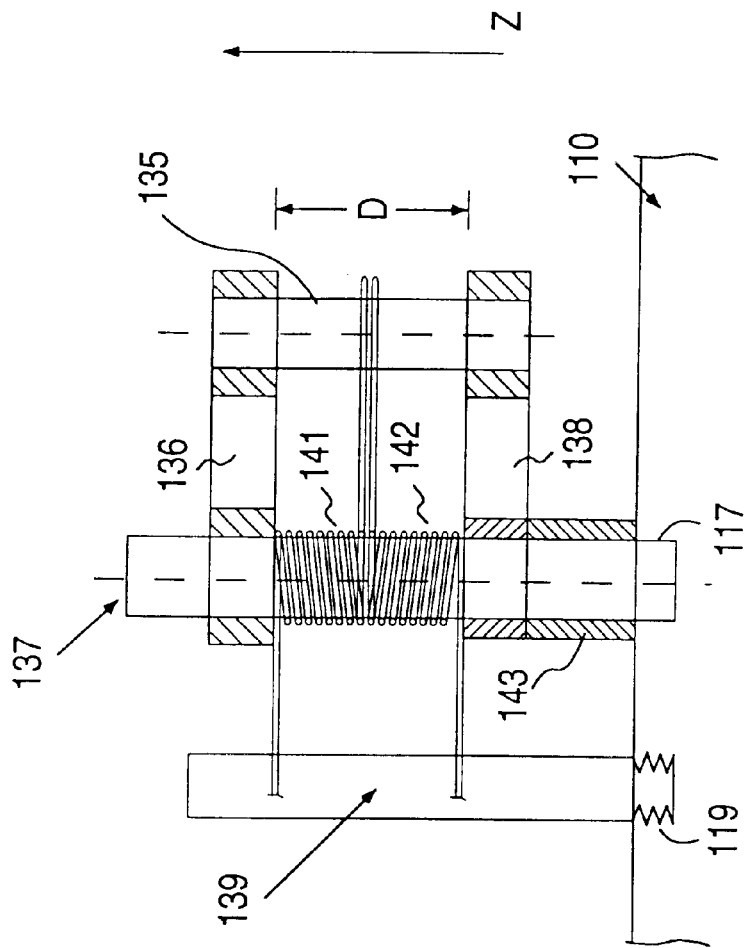

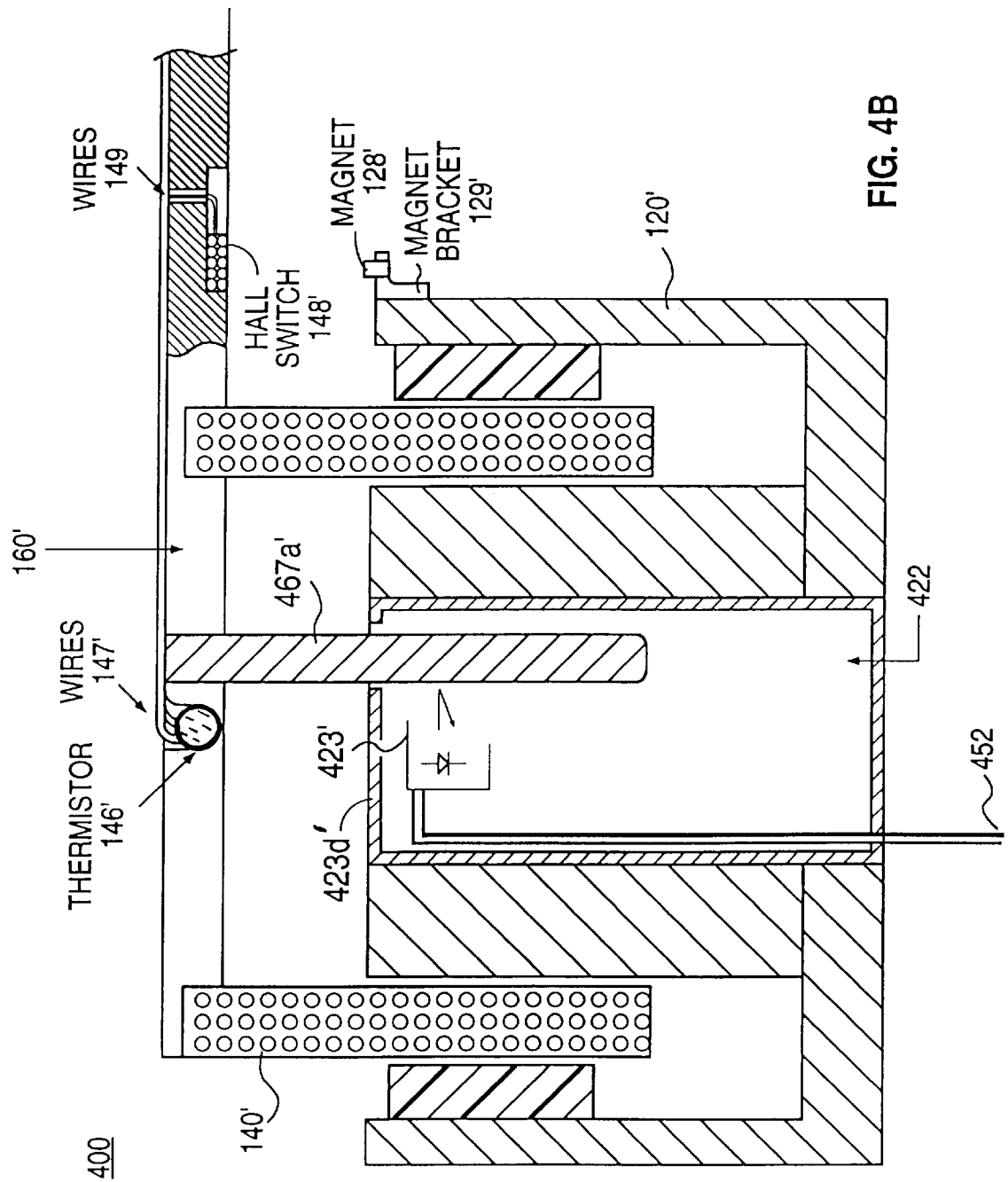

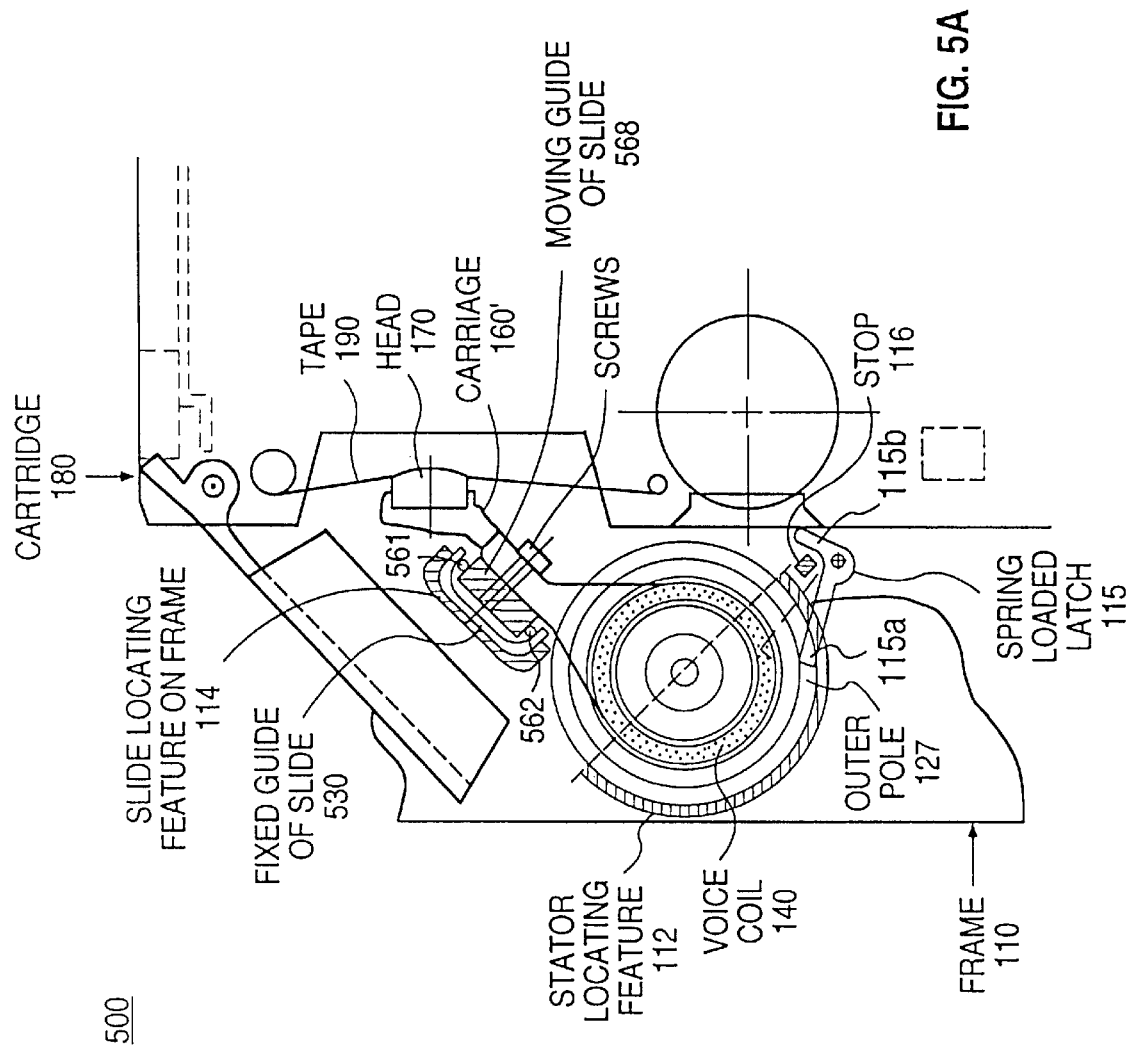

VOICE COIL DRIVEN POSITIONER FOR COARSE AND FINE POSITIONING OF MAGNETIC HEAD IN MULTI-TRACK TAPE DRIVE

This application is a divisional of Ser. No. 08/577,802, filed Dec. 22, 1995, which is a continuation of Ser. No. 08/168,716, filed Dec. 15, 1993, now abandoned.

BACKGROUND

1. Field of the Invention

The invention relates generally to magnetic recording devices. The invention relates more specifically to an apparatus and method for positioning a magnetic head relative to the tracks of a multi-track tape.

2a. Cross Reference to Related Applications

The following copending U.S. patent application(s) is/are assigned to the assignee of the present application, is/are related to the present application and its/their disclosures is/are incorporated herein by reference:

(A) Ser. No. 07/794,999 by Nayak et al. and entitled GEAR DRIVE CARRIAGE AND STEPPER ADJUSTMENT SYSTEM;

(B) Ser. No. 07/926,743 by Nayak et al. and entitled MECHANISMS FOR A CLOSED LOOP HEAD POSITIONER FOR STREAMING TAPE DRIVES.

2b. Cross Reference to Related Patents

The following U.S. patent(s) is/are assigned to the assignee of the present application, is/are related to the present application and its/their disclosures is/are incorporated herein by reference:

(A) U.S. Pat. No. 5,191,492 issued Mar. 2, 1993, to Nayak et al. and entitled MECHANISMS FOR A CLOSED LOOP HEAD POSITIONER FOR STREAMING TAPE DRIVES.

3. Description of the Related Art

High-density recording of information on multiple tracks of a magnetic tape is well known. Parallel tracks are defined to extend along a substantially longitudinal direction of an elongated magnetic tape. A magnetic head is moved in a transverse, lateral direction across the tape surface to bring a read and/or write gap of the head into proximity with a desired track prior to recording or playback. During a recording or playback session, the head is expected to remain on track while the tape moves in the longitudinal direction, past the read/write gap.

Accurate positioning of the head's read/write gap to a desired track is important. Two basic kinds of head positioners are used for providing head to track alignment: open-loop and closed-loop.

Open-loop positioners are typically employed for one-time placement of a head relative to a track and are commonly found in tape systems having relatively low track densities. The magnetic head rides on a lead screw. A stepper motor rotates the lead screw and the lead-screw converts the rotational motion of the motor into linear movement of the head. The stepper motor is advanced a fixed number of degrees to shift the head from one track to the next prior to reading or writing. The head remains in a fixed position during the read/write session. No provision is made for correcting alignment error while the tape moves and information is being read from or recorded onto the track.

Closed-loop positioners are typically used for multi-track tapes having relatively high track densities and high recording/readback rates. The tape has a tendency to disadvantageously wander in the lateral direction as it advances in the desired longitudinal direction. This creates an undesirable track-to-head misalignment. If tracks are spaced very close to one another, the lateral wander can be sufficient to produce an off-track condition. To overcome this problem, servo signals are pre-recorded onto the tape to mark the position of each track. A closed-loop servo system moves the head laterally while searching for the servo signals of a desired track and thereby brings the head into fine alignment with the desired track. Feed-back is used to continuously maintain alignment with the servo signals during the reading or writing of information from/onto the track.

A combination of an open-loop coarse positioner and closed-loop fine positioner has been proposed for positioning a magnetic head relative to a high-density multitrack tape. The above cited U.S. Pat. No. 5,191,492 discloses such a combination. A voice coil is attached to the magnetic head for providing closed-loop fine positioning while the head and voice-coil assembly rides on a lead screw that is driven by a stepper-motor to provide coarse positioning.

Such a combination of an open-loop, coarse positioner and a closed-loop, fine positioner suffers from the following drawbacks. Numerous parts are needed both for individually constructing the coarse and fine positioning subsystems and for connecting the two subsystems together. The cost of manufacture for such a combination is large due to the additive cost of the individual parts and due to the work involved in combining so many parts. The combined size of the coarse and fine positioning subsystems tends to be disadvantageously large. Integration of the open-loop and closed-loop servo electronics is complex and raises stability problems. Track switching time and/or track switching power consumption tends to be large due to the combined mass of the coarse and fine positioning subsystems.

SUMMARY OF THE INVENTION

The invention overcomes the above-mentioned problems by using a single voice coil to provide both coarse and fine positioning of a magnetic head relative to tracks of a multi-track tape.

A low-mass voice-coil attaches to a movable carriage. A magnetic head also attaches to the movable carriage. The carriage is guided along a precision path by a low-friction, motion guidance mechanism. A voice-coil positioning subsystem is provided for moving the voice-coil to desired, nominal track positions and for thereafter continuously aligning the carriage-supported head to track servo signals. One embodiment of the positioning subsystem uses an LVDT position detector for aligning the head to nominal track positions. Another version uses a pair of opposed Hall-effect transducers for positioning the head to the nominal track positions. The LVDT or Hall-effect position detector is placed within the confines of a cylindrical region whose outside defines a tubular path traveled by the voice-coil. This arrangement provides a compact voice-coil based positioning system.

A structure in accordance with the invention comprises: (a) a movable carriage supporting a magnetic head at one end of the carriage and a voice coil at a second end of the carriage; (b) a guide rail for guiding the movable carriage along a precision guide path that runs parallel and lateral to a tape surface; (c) a carriage position detecting means for detecting the position of the carriage relative to a reference; (d) a stator assembly for generating a stationary flux field passing through the voice-coil; and (e) voice-coil drive means for driving a current through the voice-coil to thereby propel the voice-coil and attached head to a desired position, the voice-coil drive means including a nominal track positioner subsystem for moving the head to predefined nominal track positions and a closed-loop servo system for thereafter moving the head into fine alignment with servo signals of a desired track.

A method in accordance with the invention comprises the steps of: (a) providing a voice coil reciprocally disposed in a magnetic stator structure, the voice coil moving relative to the stator structure in response to the application of electrical current through the voice coil; (b) providing a programmable calibration means for measuring movement of the voice coil relative to the stator structure, the output of the calibration means being defined by a programmable table look-up means; (c) removably attaching a precision measurement means to the voice coil for precisely measuring the position of the voice coil relative to the stator structure; (d) applying current to the voice coil to move the voice coil to a precision position as determined by the precision measurement means; (e) programming the programmable table look-up means to output a signal representing said position while said current is applied to the voice coil.

BRIEF DESCRIPTION OF THE DRAWINGS

The below detailed description makes reference to the accompanying drawings, in which:

FIG. 3A is a side view of a spring-loaded, movable guide rail;

FIG. 3B is a top plan view of part of the structure shown in FIG. 3A;

FIG. 4B is a cross-sectional side view showing a voice coil driven positioner including an optical position detector;

FIG. 5A is a top plan view showing an alternate embodiment for the carriage guide means;

DETAILED DESCRIPTION

Figure 1:
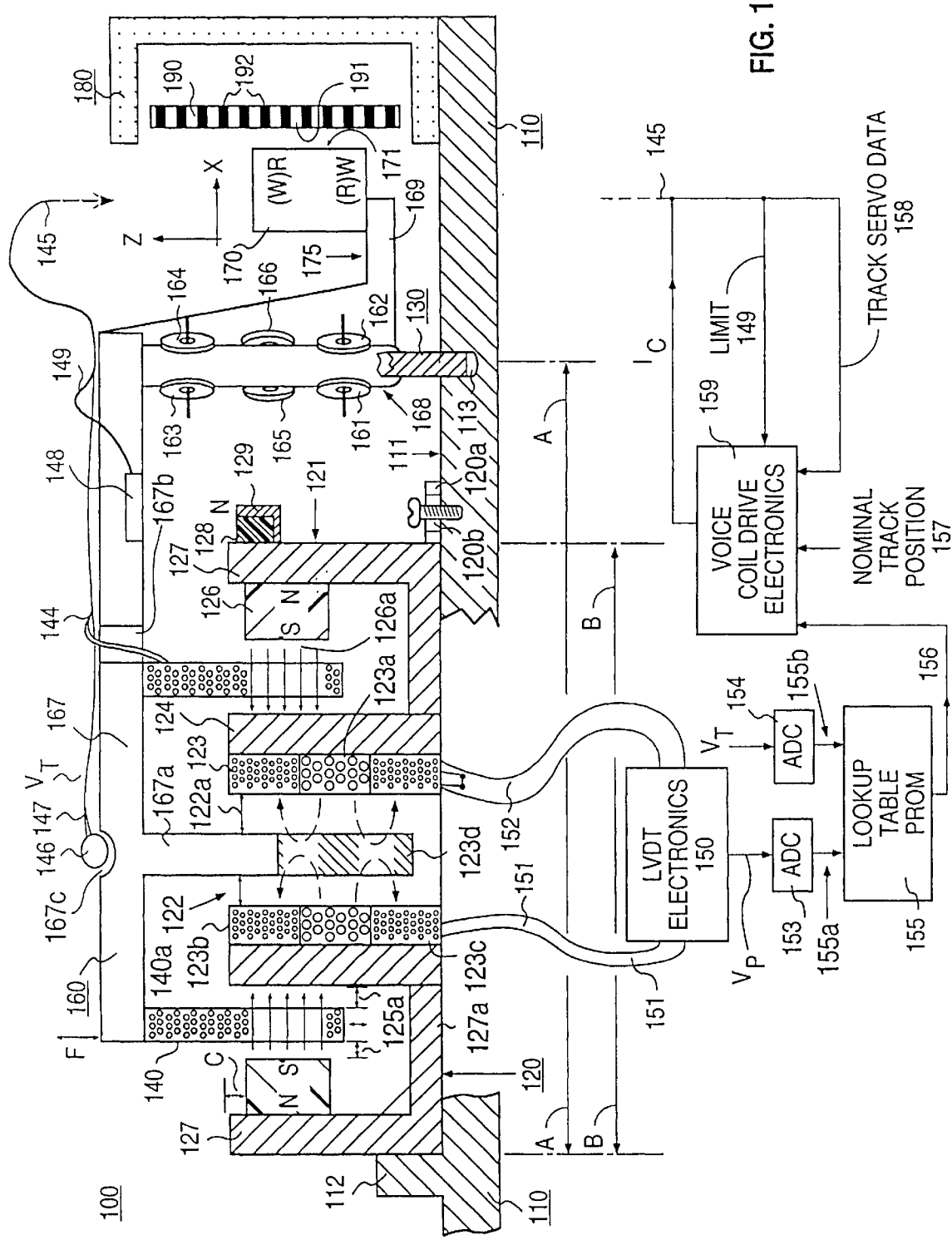
FIG. 1 is a cross-sectional side view showing a voice coil driven positioner, and a schematic of accompanying control electronics, in accordance with the invention.

Referring to FIG. 1, a sectional side view is shown of a voice coil driven, head-positioning system 100 in accordance with the invention. It is to be understood that this cross sectional view is not to scale. An "X" axis extends horizontally across FIG. 1 from left to right. A "Z" axis extends vertically from bottom to top. A "Y" axis is understood to extend out perpendicularly from the plane defined by the X and Z axes.

The head-positioning system 100 is formed on a diecast frame 110. Frame 110 is preferably made of a nonmagnetic, rigid and thermally stable material, which is preferably a metal alloy such as Aluminum Alloy 380. The frame 110 has a relatively flat, support surface 111 defined thereon for supporting a stator assembly 120. Surface 111 runs parallel to the XY plane. (Part of frame 110 is cut-away in FIG. 1 to show connection wires 151 and 152.)

The frame 110 includes a die-cast alignment feature 112 projecting vertically from a first part of the stator support surface 111. A guide-rail mounting hole 113 is bored perpendicularly into a second part of support surface 111 at a predetermined distance "A" away from a right wall of the alignment feature 112, as measured along the X axis. Distance A is greater than an outer wall-to-wall dimension "B" of a below-described stator assembly 120 and has a precision of 0.0005" (one-half thousandth of an inch) or better.

A carriage guiding rail 130, made of a rigid, preferably nonmagnetic material such as stainless steel is fixedly mounted into and centered axially over the guide-rail mounting hole 113 by press fitting, threading or other appropriate means. The material of the fixed guide rail 130 is preferably machined to define a smooth cylindrical shaft having an outside diameter of 0.156 inch at a precision of 0.0002" or better.

A movable carriage 160, having six low-friction roller wheels 161–166 protruding therefrom, engages with and rides along the fixed guide rail 130 as will be explained below. The purpose of the fixed guide rail 130 is to guide the movable carriage 160 along a precision path that runs in the Z direction. The purpose of the six low-friction roller wheels 161–166 is to serve as a low-friction means for riding along the fixed guide rail 130; and along a below-described, spring-biased, movable guide rail 135; with substantially small friction so as to thereby minimize a corresponding friction loading on a below-described voice-coil 140 when the voice coil propels the moveable carriage 160.

Stator assembly 120 is placed on the stator support surface 111 and is abutted against the right wall of alignment feature 112 so as to be precisely positioned relative to the position of the fixed guide rail 130. The stator assembly 120 has a machined, outer wall-to-wall dimension B that is less than distance A, as mentioned earlier. The outer wall-to-wall dimension B is machined to a precision of 0.00051" or better so that the dimensional difference, A–B, has a precision of 0.001" or better.

Stator assembly 120 preferably has a symmetrical tubular shape and more preferably a cylindrical shape with a coaxial cylindrical hollow (122) defined centrally therethrough. (In an alternate embodiment, the XY cross section of stator assembly 120 has a rectangular shape with rounded corners, not shown.) In the case where stator assembly 120 is cylindrical, the outer surface 121 of stator assembly 120 preferably has an O.D. (outside diameter) of 1.000 inches. Internal components of the stator assembly 120 are symmetrically disposed relative to the stator outer surface 121 and positioned at a tolerance of 0.001" or better relative to the stator outer surface 121.

An LVDT coil assembly 123, composed of a primary coil 123a and two secondary coils 123b and 123c, is secured centrally within the stator assembly 120. A core passageway 122 extends centrally through the LVDT coil assembly 123 in the Z direction for allowing free movement therethrough of an LVDT core piece 123d. The operation of the LVDT coil assembly 123 will be detailed below. For now, it is sufficient to understand that the LVDT coil assembly 123 constitutes a centrally located position measuring means that is used for measuring the position along the Z axis of the LVDT core piece 123d relative to the primary and secondary LVDT coils 123a–123c. The combination of the LVDT core piece 123d and a below-described core-support pedestal 167a constitutes a low-mass "dip stick" which reciprocates into core passageway 122 in unison with the reciprocation of a below described voice-coil 140 into a magnetic gap 125 of stator assembly 120.

An inner pole piece 124 surrounds and fastens to the outside of the LVDT coil assembly 123. The inner pole piece 124 is made of a magnetically conductive material such as steel. Pole piece 124 is used to conduct magnetic flux produced by a below-described set of permanent magnets 126. An appropriate epoxy adhesive may be used for binding the outer surface of the LVDT coil assembly 123 to the inner surface of the inner pole piece 124 or the LVDT coil assembly 123 may be press fitted into the cylindrical hollow of the inner pole piece 124. The inner pole piece 124 is preferably of a one-piece tubular construction.

The LVDT coil assembly 123 includes its own magnetic housing for retaining flux produced by the LVDT coils 123. This housing structure includes a small bonding spacer (not shown) that is 0.005 inch thick and centrally located about the middle of the outer surface of the LVDT housing for adhesive or press-fit attaching the housing at a singular point to the inner diameter of inner pole piece 124. An adhesive such as Loctite Blackmax 380™ may be used for adhesively attaching the bonding spacer to the inner pole piece 124. A gap of 0.005 inch (not shown) is established between the remainder of the outer surface of the LVDT coil assembly 123 and the inner diameter of pole piece 124 so that the remainder of the LVDT assembly 123 is free to expand equally above and below the centrally located bonding spacer as temperature changes.

In the preferred case where LVDT coil assembly 123 is cylindrical in shape, the LVDT coil assembly 123 has an inner diameter (I.D.) of 0.160 inches and an O.D. of 0.300 inches while the inner pole piece 124 has an I.D. of 0.310 inches and an O.D. of 0.550 inches.

An outer pole piece 127, preferably made of the same magnetically conducting material (steel) as the inner pole piece 124, surrounds and bonds to the inner pole piece 124. The cross section of the outer pole piece 127 resembles two side-by-side capital L's, with the capital L on the left being in normal orientation and the capital L on the right being in a facing mirror image orientation. The base legs (127a) of the forward and mirror image L's are joined to the outer surface of the inner pole piece 124 either by press fitting (with an interference fit of 0.0005 inch) or by bonding with an appropriate bonding material. The outer pole piece 127 is preferably of a one-piece tubular construction. The inner and outer pole pieces, 124 and 127, can be each formed as singular cast pieces and then joined together or, alternatively, they can be cast together as a continuous unitary piece.

The combination of inner pole piece 124 and outer pole piece 127 defines in the XZ plane, two spaced apart U-shaped magnetic-flux conductors (or yokes) through which flux 126a of a soon-described set of permanent magnets 126 flows. In the preferred case where inner pole piece 124 is cylindrical in shape, the outer cylindrical portion of the outer pole piece 127 has an inner diameter (I.D.) of 0.900 inches and an O.D. of 1.000 inches (the latter is dimension B) while the base 127a of the outer pole piece 127 has a thickness of 0.100 inches.

A set of permanent magnets 126 are bonded to the upper inner wall of outer pole piece 127. The permanent magnets 126 are oriented to have their respective north poles facing flush against the inner wall of outer pole piece 127 and their respective south poles facing inwardly towards the center of the stator assembly 120. In the preferred case where outer pole piece 127 is cylindrical in shape, the permanent magnets 126 are provided as a plurality of arc segments mounted to the inner wall of outer pole piece 127. By way of example, the permanent magnets 126 can be provided as a plurality of four 90° arc segments or six 60° arc segments. The preferred material for permanent magnets 126 is Neodymium or a like high-magnetic strength material. Flux lines 126a flow radially and uniformly from the south poles to the outer wall of inner pole piece 124.

The permanent magnets 126 are preferably positioned a small distance C (e.g., 0.020 inch) below the top edges of outer and inner pole pieces 127 and 124 so that fringe south-to-north flux flows (not shown) are captured by the top edge of outer pole piece 127 and returned to the north poles of the permanent magnets 126. The protruding top edge of outer pole piece 127 is also used to direct fringe flux-flows of a soon-described voice-coil 140 away from a later-described magnetic head 170.

A small permanent magnet 128 that serves as part of a limit switch 128/148, is positioned at the top of the stator outer surface 121 with the north (N) pole of magnet 128 facing up in the Z direction. A magnetic shield 129 having a half-cup shape surrounds and supports the opposed south (S) pole portion of reference magnet 128. The magnetic shield 129 directs the flux lines of small magnet 128 away from the system's magnetic head 170.

The thickness and material of outer pole piece 127 should be selected relative to the strength of permanent magnets 126 (and the small reference magnet 128) to prevent magnetic saturation of the outer pole piece 127 and thereby assure that fringe flux flows will be captured by piece 127 and directed away from head 170. Although not shown, an appropriate mu-shield may be placed around head 170 to shield its read/write gaps from stray magnetic fields. It has been found in practice that the distance between magnetic head 170 and sources of stray flux such as the voice-coil motor 120/140 or reference magnet 128 is often sufficiently large to reduce stray field strength to an acceptable level (e.g., 5 gauss). In such a case the mu-shield is not necessary.

A magnetic gap 125 is defined between the inwardly facing south poles of the permanent magnets 126 and the upper outer wall of inner pole piece 124. The magnetic gap 125 is sized to provide clearance for the below-described voice-coil 140 to move through the gap in the Z direction. A nominal clearance 125a of 0.010" or more is preferred about the voice-coil 140 in all directions of the X and Y plane.

In the preferred case where the inner and outer pole pieces, 124 and 127, are both cylindrical in shape, and coaxial, each permanent magnet 126 has a thickness in the XY plane of 0.060, thereby defining the inner diameter (I.D.) of the set of permanent magnets 126 as 0.780 inch. The voice coil has a thickness of approximately 0.075 inch. (The cross-sectional thickness of the voice-coil 140 is equal to the radial width of the magnetic gap 125 less twice the nominal clearance 125a.) Since the outer pole piece 127 has an O.D. of 1.00 inches and an I.D. of 0.90 inch, while the inner pole piece 124 has an O.D. of 0.550 inches, the nominal clearance dimension 125a works out to approximately 0.020 inch about each of the inner and outer walls of the voice-coil 140.

The nominal clearance 125a between the boundaries of magnetic gap 125 and voice-coil 140 is used to take up dimensional deviations in the position of the voice-coil 140 and a below-described core-support pedestal 167a relative to the stator assembly 120. The dimensional deviations can come from a number of sources, including but not limited to, thermal expansion of parts of the carriage 160 such as a soon-described left carriage beam 167, error in machining the O.D. of outer pole piece 127, error in placing guide-rail mounting hole 113 relative to alignment feature 112, and error in the machining or mounting of fixed guide rail 130.

If desired, base protrusions 120a having slotted alignment holes 120b may be provided at the outer base portion of stator assembly 120 for aligning the stator assembly 120 relative to fixed guide rail 130 at the time that the stator assembly 120 is secured to the support frame 110. In such a case, alignment feature 112 can be dispensed with, or used only for crude alignment. In the preferred embodiment, however, alignment feature 112 is used for precisely aligning the stator assembly 120 relative to fixed guide rail 130 in one step and an epoxy adhesive is deposited as a uniformly thick layer under the outer pole piece 127 for fixedly securing the stator assembly 120 to support surface 111. The latter approach reduces manufacturing costs. Other, equivalent fastening means can of course be used to secure stator assembly 120 to frame 110.

Voice-coil 140 cuts through the flux lines 126a of magnetic gap 125 such that an upwardly or downwardly directed force F is induced against the voice-coil 140 when an electrical current $I_C$ of corresponding positive or negative polarity flows through voice-coil 140. The voice-coil 140 is tube shaped and has an interior hollow 140a that allows the body of the voice-coil 140 to freely reciprocate over the outer boundary of inner pole piece 124. The voice-coil 140 mounts to the bottom of a left carriage beam 167 provided on carriage 160 and thereby propels the carriage 160 up or down in accordance with the magnitude and polarity of current $I_C$ passing through voice-coil 140. If the electrical ends of coil 140 are shorted together to maintain zero volts across the ends, a well-known braking effect develops.

Carriage 160 is made of a nonmagnetic, rigid, preferably low-mass material such as aluminum. The carriage includes a carriage center piece 168 (from which the earlier mentioned wheels 161–166 protrude), a left carriage beam 167 extending integrally from the top of a left side of the carriage center piece 168, and a right carriage beam 169 extending integrally from the bottom of an opposed right side of the carriage center piece 168. Left and right carriage beams 167 and 169 are dimensioned so that center portion 168 defines the center of gravity of carriage 160 and equal amounts of mass load the left roller wheels 161, 163, 165 and the counterpoised right roller wheels 162, 164, 166. The balanced loading masses include the mass of magnetic head 170 and the mass of voice coil 140 plus LVDT core piece 123d. The moments of the opposed left and right masses are preferably also balanced.

As seen in FIG. 1, a magnetic head 170 is adhesively mounted to a top surface of the right carriage beam 169. A removable tape cartridge 180 that contains a magnetic tape 190 is brought into engagement with the frame 110 such that a low-friction recording surface 191 of the tape 190 is brought to bear against a parallel read/write face 171 of the magnetic head 170. Tape cartridge 180 aligns to the frame 110 of the head-positioning system 100 so as to hold the tape's recording surface 191 in a generally perpendicular orientation relative to the stator support surface 111 of frame 110 and a generally parallel orientation relative to the fixed guide rail 130. Tape 190 is elongated generally in the Y direction and flexes for winding around supply and take-up reels, not shown. The tape also flexes to make conforming contact with the read/write face 171 of head 170.

The read/write face 171 preferably has a stack of two or more read gaps and two or more write gaps arranged in opposition to permit read before write on a given track either when the tape 190 moves in a forward direction or a reverse direction.

Carriage 160 moves the magnetic head 170 up or down in the Z direction while maintaining engagement of the head read/write face 171 with the tape's recording surface 191. The magnetic head 170 is moved so that a desired one of the forward-reverse read/write gap pairs, (R)W or (W)R, is brought into alignment with a desired one of plural tracks 192 defined on the tape's recording surface 191. While not shown, it is understood that servo signals are pre-recorded on the tape's recording surface 191 to define the positions of the plural tracks 192.

The fixed guide rail 130 is used to limit the degrees of freedom of the carriage 160 and to thereby define a precision path along which the magnetic head 170 moves as voice-coil 140 propels the carriage 160 up and down. Four of the low-friction roller wheels, 161–164, are rotatably mounted on a front side of carriage center piece 168 and oriented for riding stably and with minimal drag against a back surface of the fixed guide rail 130. (See the top plan view of FIG. 2.)

As seen in FIG. 1, the first and second roller wheels 161 and 162 are positioned at a lower portion of carriage center piece 168 while the third and fourth roller wheels 163 and 164 are positioned in counter-symmetry at an upper portion of carriage center piece 168 so as to hold the carriage center piece 168 in parallel and stable alignment with a back surface of the fixed guide rail 130. Right carriage beam 169 extends rigidly from the bottom of the carriage center piece 168 so as to hold the head's read/write surface 171 parallel to the travel path of the carriage center piece 168. Left carriage beam 167 extends rigidly from the top of the carriage center piece 168 so as to hold a central axis the voice-coil 140 parallel to the travel path of the carriage center piece 168.

Figure 2:
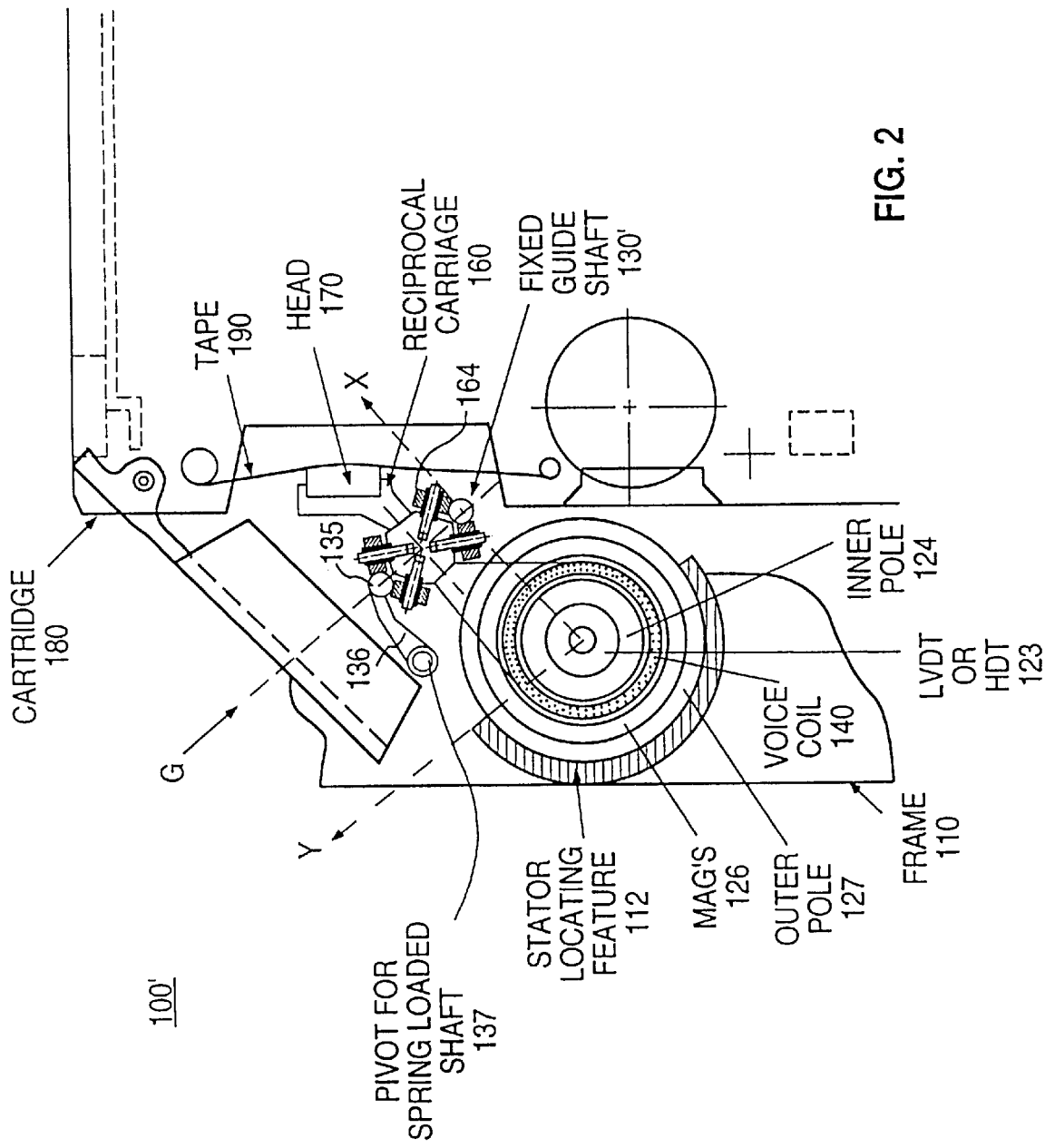
FIG. 2 is a top plan view showing the voice coil driven positioner of an embodiment of FIG. 1, engaged with a removable tape cartridge.

The fifth and sixth roller wheels 165 and 166 are rotatably mounted on a back side of carriage center piece 168 and oriented for riding stably and with low-friction against a spring-biased, movable guide rail 135 (shown in FIGS. 2 and 3). The fifth and sixth roller wheels 165 and 166 are positioned symmetrically between the lower wheels 161–162 and the upper wheels 163–164 in order to apply equal subcomponents of a bias force G (FIG. 2) supplied to the fifth and sixth roller wheels 165 and 166 from the spring-biased, movable guide rail 135 shown in FIG. 2.

Roller wheels 161–166 are preferably all identical and each formed of a low-friction bearing such as a 0.156 O.D. type available from NMB Corporation of Chatsworth, Calif.

Referring to FIG. 2, a top plan view of a preferred embodiment 100' having the cross section of FIG. 1 is shown. Although like reference numbers are used to refer to elements of FIG. 2 that have like counterparts in FIG. 1, it is to be understood that other top-view embodiments of the cross section of FIG. 1 are possible.

In FIG. 2, the X axis runs from the axial center of cylindrical stator assembly 120 to and through the axial center of fixed guide rail 130. Tape 190 extends in a direction roughly 50° counterclockwise of the X direction. A cartridge cover 185 of tape cartridge 180 is opened to expose the tape's recording surface 191. The exposed recording surface 191 is brought to bear against the read/write face 171 of magnetic head 170 as the tape cartridge 180 is inserted into the recording mechanism.

Carriage center piece 168 has a rectangular top-view profile with beveled corners as shown. The elongated center axis of this rectangular shape runs in the Y direction, perpendicular to the X axis. Pins are press-fitted into the beveled corner faces of carriage center piece 168 to support roller wheels 161–166. Roller wheels 161–164 make tangential contact with the back surface of fixed guide rail 130 while roller wheels 165–166 make tangential contact with the front surface of the spring-biased, movable guide rail 135. The movable guide rail 135 has the same O.D. as fixed guide rail 130 and is mounted vertically on pivot arm 136. The pivot arm 136 pivots about pivot shaft 137 so as to bring the movable guide rail 135 into engagement with roller wheels 165–166 while the axial axis (Z direction axis) of the spring-biased, movable guide rail 135 aligns substantially with the elongated center axis of the carriage center piece 168 to a precision of 0.001" or better. The orientation of carriage 160 is thereby set in the X by Y plane of FIG. 2 using the bias force G provided by the spring-biased, movable guide rail 135.

FIG. 3A shows a side cross-sectional view of a preferred spring-loaded mechanism for applying biasing force G to the movable guide rail 135. Pivot shaft 137 is press fit into a bore hole 117 of frame 110 at a predetermined location relative to the fixed guide-rail mounting hole 113. Positioning precision should be to within 0.001" or better. Two substantially identical spiral springs, 141 and 142, are placed in mirror image orientation about pivot shaft 137. The springs 141–142 apply biasing force G to the center of movable guide rail 135 by way of respective first spring ends, as shown. The other ends of springs 141–142 rest against respective top and middle portions of a spring-rest post 139. The spring-rest post 139 is mounted vertically into a threaded bore hole 119 of frame 110.

Pivot arm 136 is pivotally mounted at a top portion of pivot shaft 137 and rests on top of the biasing springs, 141 and 142. A substantially similar, lower pivot arm 138 is pivotally mounted at a lower portion of pivot shaft 137, below the biasing springs, 141 and 142, but resting on top of a support bushing 143. Spring-biased, movable guide rail 135 is supported between the extreme ends of pivot arm 136 and lower pivot arm 138, to provide a total travel distance D thereon for the two roller wheels 165–166. Travel distance D should be sufficiently large and appropriately positioned to allow the read/write gaps of magnetic head 170 to begin their Z-direction travel below the lower edge of the tape's recording surface 191 and to cover the full lateral extent of the tape's recording surface 191.

Referring again to FIG. 2, the magnetic head 170 is mounted on carriage 160 at the same approximately 50° angle relative to axis X as that of the tape 190 so that the head read/write face 171 engages relatively flush with the tape surface 191. Excessive shocks that may be applied to the free-floating carriage 160 are absorbed by rotation of the spring-loaded pivot arm 136 out of its nominal position. The spring-provided loading force G is set to hold movable guide rail 135 in its nominal position for normal shock and vibration.

The alignment feature 112 of FIG. 2 preferably has a semi-cylindrical shape as shown in FIG. 2. During assembly, the spring-biased, movable guide rail 135 is retracted away from the region occupied carriage center piece 168. The combination of stator assembly 120 and carriage 160 is positioned by abutting the stator outer surface 121 against alignment feature 112 and further abutting the four roller wheels 161–164 against fixed guide rail 130. The movable guide rail 135 is released to engage roller wheels 165–166. The ability of the carriage 160 to travel freely up and down along fixed guide rail 130 is tested before the adhesive that bonds stator assembly 120 to frame 110 sets.

Referring again to FIG. 1, the operation of the LVDT coil assembly 123 is now explained in detail.

A first step in bringing a read/write gap ((W)R or R(W)) into alignment with the servo signals of a desired track is to move the read/write gap in open-loop fashion to a nominal track position that coarsely aligns with the desired track. The LVDT coil assembly 123 is used for such coarse alignment.

An excitational AC signal 151 is applied to the primary coil 123a of the LVDT coil assembly 123 from an LVDT control module 150. LVDT core piece 123d couples the excitational AC signal to secondary coils 123b and 123c. The magnitude of excitational energy coupled to each of secondary coils 123b and 123c varies with the position of LVDT core piece 123d relative to each of the secondary coils 123b and 123c.

The secondary coils 123b and 123c are series connected in a 180° phase relation so as to produce a null, secondary output signal 152 when the LVDT core piece 123d is centered relative to the secondary coils 123b and 123c. The magnitude of the secondary output signal 152 varies in a generally linear fashion as the LVDT core piece 123d is moved up or down, away from the center position. The polarity of the secondary output signal 152 indicates whether the LVDT core piece 123d has moved either above or below the center position.

The LVDT control module 150 outputs an analog, DC voltage, $V_P$ representing the position of the LVDT core piece 123d relative to the secondary coils 123b and 123c. LVDT transducer systems and more detailed descriptions thereof may be obtained from Lucas Schaevitz, Inc. of Pennsauken, N.J.

A first analog-to-digital converter (ADC) 153 converts the analog output voltage, $V_P$, of the LVDT control module 150 into a first digital index signal 155a. This first digital index signal 155a serves as part or the whole of a look-up address signal supplied to a look-up table module 155.

Look-up table module 155 is preferably a programmable-read-only memory unit (PROM) that is programmed in accordance with a below described calibration method to produce a digital, head-position indicating signal 156. The head position indicating signal 156 is binary coded to represent the position of magnetic head 170 relative to frame 110 to a desired precision and accuracy. It is to be understood of course, that other, like code-conversion means can be used for converting the code of the first digital index signal 155a (optionally combined with a soon-described second digital index signal 155b) into the code of the head-position representing signal 156.

Head position indicating signal 156 is supplied to a first input of a voice-coil drive module 159. The voice-coil drive module 159 has a second input which receives an externally supplied, digital code signal 157 representing a desired, nominal track-position. A feed-back circuit (not shown) of the voice-coil drive module 159 outputs voice-coil current $I_C$ to voice-coil 140 so as to bring the position represented by the head position indicating signal 156 into convergence with the desired head position that is represented by the nominal track-position signal 157.

Voice-coil drive module 159 has a third input which receives track servo signals 158 picked up by the active read gap ((R) or R) of magnetic head 170. A fourth input of the voice-coil drive module 159 receives a limit-indicating signal 149 from a below described Hall-effect detector 148 of a limit switch 128/148.

The feed-back circuit (not shown) of voice-coil drive module 159 remains active until it reduces the error between the head position indicating signal 156 and the nominal track-position signal 157 to a predefined, acceptably small level. Then a closed-loop servo circuit (not shown) of voice-coil drive module 159 takes control. The closed-loop servo circuit adjusts the voice-coil current $I_C$ in response to the received servo signals 158 to bring head 170 into fine alignment with the desired track and to continuously maintain such alignment as long as the current track continues to be the desired track. When a switch over to a new track is requested, a corresponding new nominal track-position signal 157 is supplied and the feed-back circuit (not shown) of voice-coil drive module 159 is reactivated. If the tape does not have track-centering servo signals recorded thereon, closed-loop servo circuit (not shown) of voice-coil drive module 159 is not activated and the feed-back circuit (not shown) of voice-coil drive module 159 remains active to minimize error between the head position indicating signal 156 and the nominal track-position signal 157.

Thermal expansion of the material forming carriage 160, and particularly of the core-support pedestal 167a, becomes a problem when open-loop positioning for very-closely spaced tracks is desired. A thermistor 146 or like temperature sensor is placed in a hollow 167c formed at a top portion of left carriage beam 167, preferably near the core-support pedestal 167a. The thermistor 146 is used for sensing the temperature of the head-positioning system 100 in general and more specifically, of the core-support pedestal 167a. An analog voltage, $V_T$, representing the temperature at hollow 167c develops across thermistor 146 and is carried by fine wires 147 over the top of carriage 160 to a flexible cable 145 that extends off of the carriage center piece 168. The flexible cable 145 flexibly connects electrical terminals at the top of the carriage center piece 168 to electronic control modules such as 159 and 154 that are mounted on frame 110. Electronic control modules such as 159, 154 are preferably mounted on frame 110 in order to minimize the mass of movable carriage 160 and its supported elements, e.g., 140 and 170. Flexible cable 145 should be sufficiently flexible so that it applies negligible drag to the movement of carriage 160.

The analog thermistor voltage, $V_T$, couples by way of the flexible cable 145 to a second analog-to-digital converter (ADC) 154. The second analog-to-digital converter (ADC) 154 converts $V_T$ into a second digital index signal 155b which is optionally combined with first digital index signal 155a to define the address input signal that is applied to look-up table module 155. If temperature compensation is not desired, the second digital index signal 155b is fixed at zero and thermistor 146 is not included in the system.

Flexible cable 145 also carries the voice-coil current $I_C$ from voice-coil drive module 159 to terminal wires 144 of voice-coil 140. A through-hole 167b is provided in carriage 160 communicating between the bottom and top of the left carriage beam 167 for passing the voice-coil terminal wires 144 from under beam 167 to its top. wires 144 run on top of beam 167 to the connection points provided at the top of carriage center piece 168 to flexible cable 145.

The flexible cable 145 further carries a reference position signal 149 (also referred to as a limit-indicating signal 149) from a Hall-effect detector 148 of the earlier mentioned limit switch 128/148 to the fourth input of voice-coil drive module 159. The Hall-effect detector 148 is positioned in a hollow 167d of left carriage beam 167 and aligned vertically above the small reference magnet 128 that is provided on the stator outer surface 121. When the magnetic field density of reference magnet 128 reaches a critical strength, as the bottom of left carriage beam 167 approaches closer and closer to the top of stator assembly 120, the reference position signal 149 output by the Hall-effect detector 148 switches from a logic low to logic high level. This reference position signal 149 indicates a limit position of the carriage 160 where left carriage beam 167 is about to hit against the top of outer pole piece 127. This indication of the limit position 149 is fed to the voice-coil drive module 159 and used by module 159 to avoid driving the carriage 160 into collision with the stator assembly 120.

The UGN3503™ is an example of a digital Hall-effect detector that can be used for implementing limit detector 148. The UGN3503™ is an integrated circuit which combines in one package, a Hall-effect element and a temperature stabilized comparator/amplifier and a Schmitt trigger output stage having a predefined amount of hysteresis. The UGN3503™ is available from Allegro Microsystems, Inc. of Worcester, Mass.

Calibration and programming of the look-up table module 155 proceeds after completion of the assembly of head-positioning system 100, as follows. The head-positioning system 100 is placed in a temperature-stabilized environment and the temperature is set to a first of plural subdivisions of an expected range of operating temperatures.

A reference platform 175 is provided on the right carriage beam 169 for removably attaching an interferometer mirror (not shown) or more preferably an interferometer prism (not shown) to the movable carriage 160. A laser interferometer system, that includes the interferometer prism/mirror (not shown) removably clipped onto the reference platform 175, is used to precisely measure the position of the magnetic head 170 relative to the frame 110. The output of look-up table module 155 is decoupled from the first input (156) of the voice-coil drive module 159 at this time. The LVDT coil assembly 123 and LVDT control module 150 remain active, however.

The nominal track-position signal 157 at the second input of the voice-coil drive module 159 is set to an appropriate level (analog or digital) that indicates a desired nominal track position. The decoupled first input (156) of the voice-coil drive module 159 is then adjusted (with an external supply rather than from the output of look-up table module 155) to produce a voice-coil current $I_C$ that brings the magnetic head 170 to the desired nominal track position based on measurements of the interferometer at the set temperature.

For each nominal track position in the set of all nominal track positions, the corresponding input (156) of the voice-coil drive module 159 that produces the desired positioning of the magnetic head 170 is written into look-up table module 155 at the address then indicated by the first and second digital index signals, 155a and 155b.

After data is collected for all nominal track positions at the first temperature, the temperature is set to another of the plural subdivisions of the expected range of operating temperatures, and the above calibration process is repeated. This step is repeated until calibration has been performed for all of the plural subdivisions of the expected range of operating temperatures.

After calibration is completed for all nominal track positions and all subdivisions of the expected range of operating temperatures, remaining entries of look-up table module 155, if any, are filled by interpolation. A detailed description of this process may be found in the above cited patent application, Ser. No. 07/794,999 entitled GEAR DRIVE CARRIAGE AND STEPPER ADJUSTMENT SYSTEM.

Once interpolation is complete, look-up table module 155 will store a custom translation algorithm for converting each given combination of first and second digital index signals 155a and 155b (LVDT output and thermistor output) of the specific head-positioning system 100 into a corresponding and calibrated, head position indicating signal 156. Then, when the output of look-up table module 155 is reconnected to first input (156) of the voice-coil drive module 159, the head position indicating signal 156 will provide a calibrated indication of the actual head position. The feed-back circuit (not shown) of the voice-coil drive module 159 can then be used to output a voice-coil current $I_C$ that accurately brings the position of the head 170, as indicated by the head position indicating signal 156, into convergence with the desired head position that is requested by the nominal track-position signal 157.

FIG. 4 shows an alternate embodiment 400 in which another form of position indicating means 423 is provided within the hollow 422 of the tubular shape of the stator assembly 120' for indicating the position of the magnetic head 170 relative to a desired nominal track position. All other elements of the head positioning system remain substantially the same as those in FIG. 1 and are thus not shown. Reference numerals in the "400" series are used to denote elements having like counterparts numbered in the "100" series in FIG. 1.

The alternate position indicating means 423 comprises a pair of Hall-effect detectors 423a and 423b mounted at opposed ends of the hollow passageway 422. Like the LVDT coil assembly 123, the Hall-effect-based position indicating means 423 is positioned in the region that fills the interior of a tubular path taken by voice-coil 140. This arrangement provides a compact voice-coil motor with integrated position sensing means. A movable, permanent bar magnet 423c moves up and down within the hollow passageway 422. The south pole (S) of magnet 423c faces up in the Z direction while the north pole (N) faces down. The detected strengths of the magnetic fields generated by the movable permanent magnet 423c increase or decrease as magnet 423c respectively approaches or moves away from a given one of Hall-effect detectors 423a and 423b. The voltage across a Hall-effect element in each detector varies roughly in proportion to magnetic field strength. The UGN3503™ is an example of a linear Hall-effect detector that can be used for implementing Hall-effect detectors 423a and 423b. The UGN3503™ is an integrated circuit which combines in one package a Hall-effect element and a linear, temperature stabilized amplifier; and is available from Allegro Microsystems, Inc. of Worcester, Mass.

An L-shaped support bracket 467a that is made of a nonmagnetic material such as aluminum connects the movable permanent magnet 423c to the carriage 160 so that magnet 423c moves together with the carriage 160 and thereby indicates the position of the carriage by the strength of the magnetic field radiated to the Hall-effect detectors 423a and 423b from the poles of movable permanent magnet 423c. Thermistor 146' is used for measuring the temperature of support bracket 467a and is used as an input to the look-up table module 155 (not shown) for compensating for thermal expansion of the support bracket 467a.

Magnet 423c should be of a low-weight, high-field strength formulation such as Neodymium so that the overall mass of the movable carriage 160 is not significantly increased by the mass of the magnet 423c. Inner pole piece 124 acts as a magnetic shield for diverting the flux lines of the movable permanent magnet 423c away from magnetic head 170. If desired, an additional mu-shield 423d can be formed about Hall-effect-based position indicating means 423 as shown.

The output voltages of Hall-effect detectors 423a and 423b are denoted respectively as $V_A$ and $V_B$. These voltages are output on wires 452 and combined in accordance with below equation Eq. 1 to define a position voltage $V_P$ that indicates the position of the carriage-supported, magnetic head 170.

$$V_P = (V_A - V_B)/(V_A + V_B) \qquad \text{(Eq. 1)}$$

Note that $V_P$ nulls out when the movable permanent magnet 423c is approximately midway between Hall-effect detectors 423a and 423b. The denominator $(V_A + V_B)$ of Eq. 1 provides enhanced sensitivity near the midpoint of the travel of movable permanent magnet 423c, where the sum $V_A + V_B$ tends to be at a minimum. The ratiometric definition of position, as given by Eq. 1, eliminates dependency on the absolute values of respective voltages $V_A$ and $V_B$. $V_P$ is unique for each position of the movable permanent magnet 423c.

The look-up table calibration process described for the LVDT-based position indicating assembly 123 is also applicable to the Hall-effect-based position indicating means 423 and as such, will not be described again here.

Those skilled in the art of position measurement will recognize from the above that other forms of position determining means can be provided within the hollow 422 of the tubular shape of the voice-coil 140 for indicating the position of the magnetic head 170 relative to a desired nominal track position. It is desirable that the movable portion that connects to carriage 160 should be of low mass and the overall position determining means should be compact in size.

By way of further example, FIG. 4B shows how an optical position determining means can be formed using an optical scale 467a' that reciprocates vertically within hollow passageway 422 of stator assembly 120 and a scale reading means (e.g., one or more LED's and photodiodes) 423' fitted in the hollow. Scale 467' is preferably a light weight optical ruler having quadrature or other optical patterns defined thereon. A fixed set of one or more LED's and photodiodes are provided in scale reading means 423' and fitted in the hollow 422 for illuminating and reading the quadrature or other optical patterns defined on the scale 467a'.

Those skilled in the art of motor design will recognize from the above that the combination of a voice-coil 140 and interiorly positioned means (123d or 423c or 467a') for determining the position of the voice-coil provides a compact motor that can be used for many applications other than the positioning of a magnetic recording head 170 relative to a tape.

Referring to FIG. 5A, a top view is shown of an alternate guide mechanism 500 for defining the paths traveled by the carriage supported voice-coil 140 and head 170. A slide member 568 is fixedly fastened by screws or other means to a center portion of a carriage 160'. In this particular embodiment, carriage 160' does not have roller wheels 161–166 protruding from its center piece. Slide member 568 is made of an aluminum alloy having a certain degree of flexure (e.g, Aluminum 6061 T-6) and machined to a fine smoothness.

A stationary member 530 that has a C-shape in the XY plane functions as a guide rail. Stationary member 530 is abutted against and secured by adhesive or otherwise to a raised, C-shaped locating feature 114 defined on the stator support surface 111 of frame 110. The slide member 568 reciprocates in the Z direction along the interior of the C-shaped stationary member 530 while being held in fixed orientation in the XY plane by a pair of opposed sets of top-wall bearing balls 561 and bottom-wall bearing balls 562 that are situated at the opposed top and bottom inner walls of the C-shape of stationary member 530.

Figure 5B:
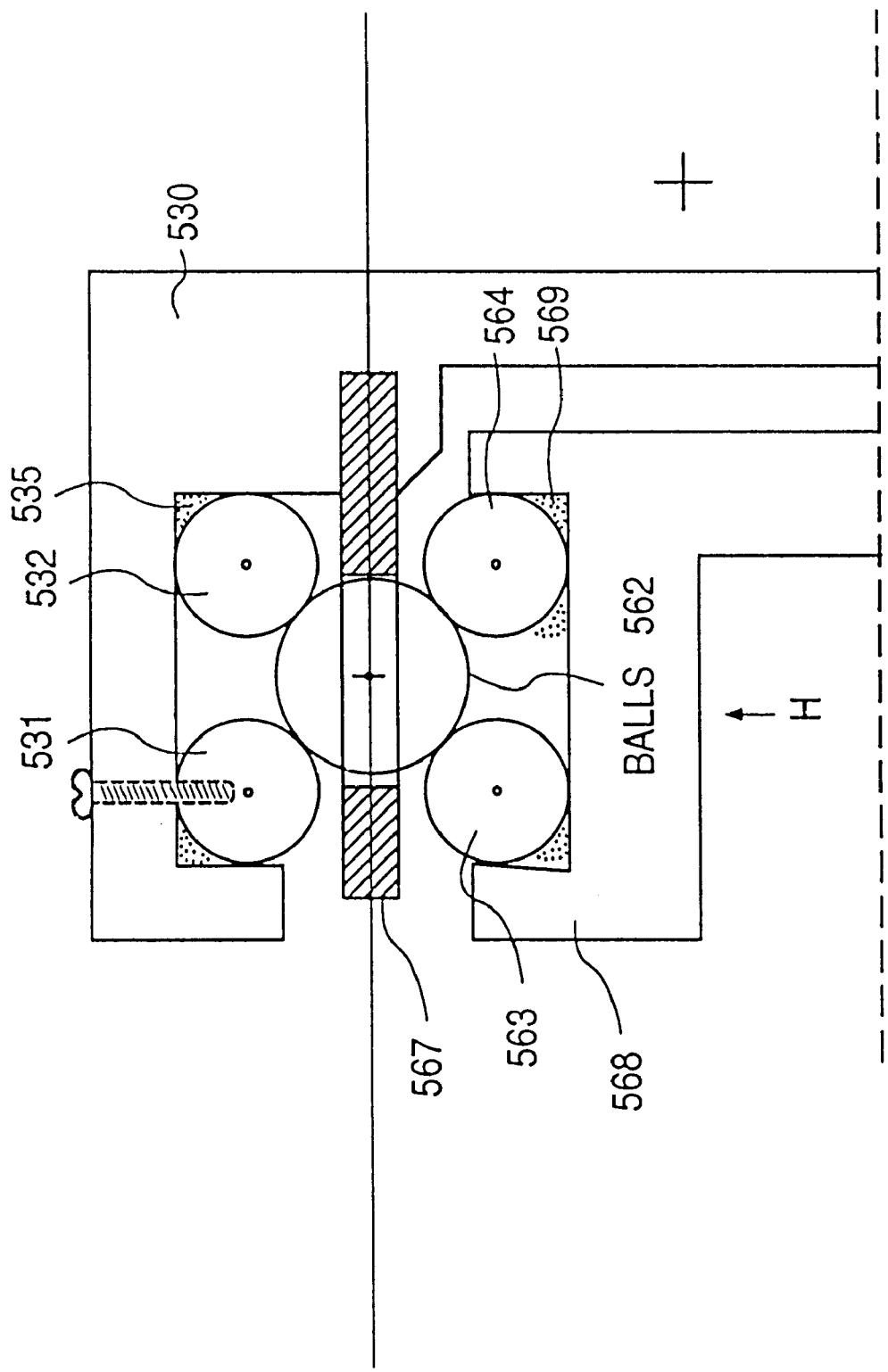
FIG. 5B is a cross-sectional top view showing details of the carriage slide mechanism shown in FIG. 5A.

FIG. 5B provides a detailed cross-sectional top-view of a the guide mechanism 500. Slide member 568 also has a C-shape that faces in the same direction and fits within the C-shape of the stationary member 530. The stationary member 530 is preferably abutted against the locating feature 114, which feature is a die-cast extension of frame 110, and which is made of a rigid material. The slide member 568, on the other hand is preferably made of a resilient material with such as an aluminum alloy having spring-like flexure. Slide member 568 is dimensioned such that insertion of the springy slide member 568 into the rigid C-shape of the stationary member 530 applies a spring-loaded force H against the inner top and bottom sidewalls of the stationary member 530.

Four guide shafts are provided as two pairs 531–532, 533–534, each against the inner sidewalls of the stationary member 530 (only pair 531–532 is shown). Four additional guide shafts are provided as two pairs 563–564, 565–566, each against the outer side walls of slide member 568. Shafts 531–532 oppose shafts 563–564. Shafts 533–534 (not shown) oppose shafts 565–566 (not shown). The bearing balls 561, 562 (only balls 562 are shown) ride in grooves created between the opposed guide shaft pairs, 531–532 versus 563–564, and 533–534 versus 565–566. A balls cage 567 confines the bottom bearing balls 562 to uniformly spaced vertical spots along the groove between opposed guide shafts 531–532 versus 563–564. Another balls cage (not shown) confines the upper bearing balls 561 to uniformly spaced vertical spots along the groove between opposed guide shafts 533–534 versus 565–566 (not shown).

Shafts 531–532 are attached to the inner wall of the stationary member 530 either by screws and/or with an appropriate resilient adhesive 535 such as Loctite Black Max 380™. Shafts 563–564 are similarly attached to the opposed outer wall of the slide member 568 either by screws and/or with an appropriate adhesive 569 such as Loctite Black Max 380™.

Shafts 531–532 and shaft 563 are rigidly positioned by 90° corners of respective fixed and sliding members 530, 568. This defines the path traveled by slide member 568. Guide shaft 564 is resiliently positioned by adhesive 569 along the outer wall of slide member 568 so that there is some give in the positioning of shaft 564. Balls cage 567 is preferably made of a resilient material so there is give in its positioning. The balls cage 567 is attached to the stationary member 530 as shown to position the bearing balls 562 in the groove opposed guide shafts 531–532 versus 563–564.

Referring again to FIG. 5A, during times when a tape cartridge 180 is not inserted in the tape drive, it is preferable to confine the movement of the carriage 160 so as to avoid damage from shock. A spring loaded latch 115 is provided on frame 110 for sliding over voice-coil 140 and preventing its movement at the time a tape cartridge 180 is withdrawn from the drive. Appropriate electrical drive signals are supplied to the voice-coil motor prior to withdrawal to park the voice-coil 140 safely inside the confines of magnetic gap 125 prior to withdrawal. A stop feature 116 on the frame 110 opposes the spring force of the spring loaded latch 115 and places a first end 115a of the latch 115 over the carriage 160 to block movement of the carriage. When a tape cartridge 180 is inserted into the drive, the tape cartridge 180 engages a second end 115b of the latch 115 and rotates the first end 115a of the latch 115 away from the reciprocating path of the carriage 160.

Figure 4A:
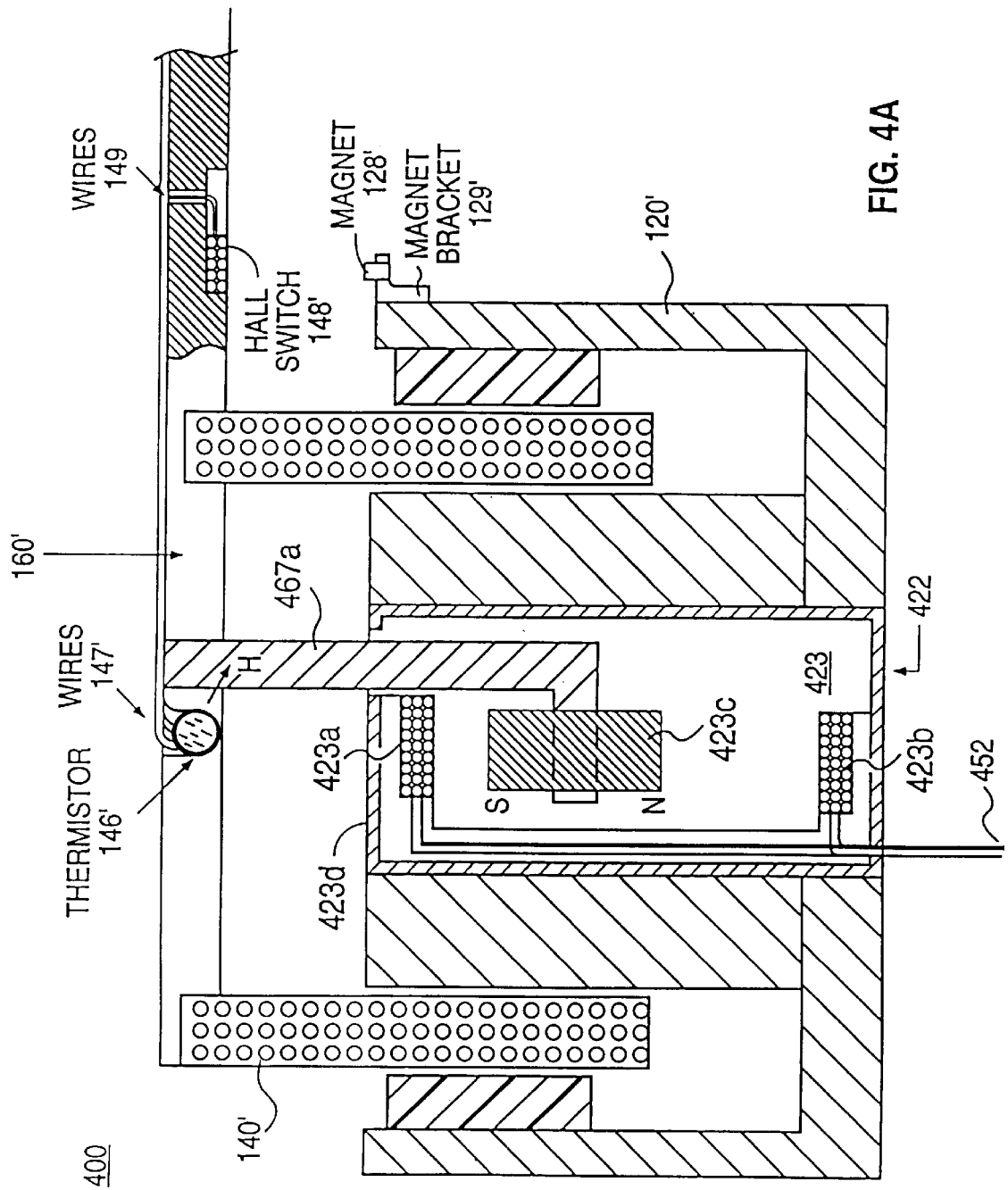
FIG. 4A is a cross-sectional side view showing a voice coil driven positioner including a Hall-effect position detector.

The above disclosure is to be taken as illustrative of the invention, not as limiting its scope or spirit. Numerous modifications and variations will become apparent to those skilled in the art after studying the above disclosure. By way of example, although the "dip stick" portion 167a, 467a or 467a' of the respective LVDT, Hall and optical position detectors of FIGS. 1, 4A and 4B are shown to be conveniently located centrally in the hollow of the voice coil for reciprocating into an opposed central hollow of the stator, other positionings can be used. In the case of the optical position detector (FIG. 4B) for example, an optical scale pattern can be applied (e.g., painted on) to an inner or outer wall of the voice coil and detected as such when it reciprocates with the voice coil into the magnetic gap 125 either by an optical illuminator/detector positioned below permanent magnets 126 or through a hole bored through one or the other of the inner and outer pole pieces 124, 127. The dip stick can be positioned elsewhere on the carriage 160 for moving in unison with the carriage relative to the frame 110 and a position detector fixed portion that is attached to the frame 110.

Given the above disclosure of general concepts and specific embodiments, the scope of protection sought is to be defined by the claims appended hereto.

What is claimed is:

1. A head positioning apparatus for positioning a magnetic head in a multi-track tape drive, said apparatus comprising:
    (a) a voice-coil having a hollow defined in an interior portion thereof;
    (b) a stator assembly for generating a flux field passing through the voice-coil;
    (c) a movable carriage supporting the magnetic head and the voice coil;
    (d) a guide rail operatively coupled to the movable carriage for guiding the movable carriage along a predefined guide path that carries the head to a desired track position of a supplied multi-track tape and carries the voice-coil through the flux field generated by the stator assembly;
    (e) carriage position measuring means for measuring the position of the carriage relative to a reference frame;
    wherein the carriage position measuring means includes:
    (e.1) a permanent magnet coupled to the carriage so as to move with the carriage, said magnet being situated within the hollow of the voice-coil; and
    (e.2) stationary detecting means for detecting the position of the magnet relative to the stationary detecting means, the stationary detecting means being situated in a region traversed by the hollow of the voice-coil.

2. A head positioning apparatus according to claim 1 further comprising:
    (f) voice-coil drive means for driving a current through the voice-coil to apply a motive force to the voice-coil and thereby propel the attached carriage and head to a desired position, the voice-coil drive means including:
    (f.1) a nominal track positioner subsystem for moving the head to a desired one of predefined nominal track positions; and
    (f.2) a closed-loop servo subsystem for moving the head into fine alignment with servo signals of the desired track.

3. A head positioning apparatus according to claim 2 further comprising:
    limit-indicating means, operatively coupled to the carriage and to the stator assembly, for detecting and indicating a condition wherein a separation between the carriage and the stator assembly is equal to or less than a predefined limit distance;

said voice-coil drive means being responsive to the limit-indicating means, for inhibiting movement of the carriage toward the stator assembly if the separation between the carriage and the stator assembly is indicated to be equal to or less than the predefined limit distance.

4. A head positioning apparatus according to claim 2 further comprising:
(g) a flexible cable having one end coupled to the movable carriage for conducting said voice coil drive current to the voice-coil.

5. A head positioning apparatus according to claim 1 further comprising:
(h) limit-indicating means, attached to the carriage and operatively coupled to the stator assembly, for detecting a condition wherein a separation between the carriage and the stator assembly is equal to or less than a predefined limit distance and for outputting a limit-indicating signal representative of said condition;
wherein the flexible cable conducts said limit-indicating signal to the voice-coil drive means; and
wherein the voice-coil drive means is responsive to the limit-indicating signal, for inhibiting movement of the carriage toward the stator assembly if the separation between the carriage and the stator assembly is indicated to be equal to or less than the predefined limit distance.

6. A head positioning apparatus according to claim 4 wherein said carriage position measuring means outputs a position measurement signal that is subject to error due to temperature variation, said apparatus further comprising:
(h) temperature measurement means, attached to the carriage, for measuring a temperature of the moveable carriage and for generating a temperature indicating signal in response to the measured temperature; and
(i) combining means for combining the temperature indicating signal with the position measurement signal to produce therefrom a temperature-compensated position indicating signal;
wherein the flexible cable conducts said temperature indicating signal from the temperature measurement means to the combining means.

7. A head positioning apparatus according to claim 6 wherein said magnetic head converts magnetic signals prerecorded on a supplied multi-track tape into electrical signals, and wherein the flexible cable conducts the head-produced electrical signals.

8. A head positioning apparatus according to claim 2 wherein said nominal track positioner subsystem includes a digital storage means for defining said predefined nominal track positions.

9. A head positioning apparatus according to claim 1 wherein the stationary means has a passageway defined therethrough and aligned with the magnet for permitting free movement of the magnet through the passageway.

10. A head positioning apparatus according to claim 9 wherein each of the voice-coil and the stationary detecting means is cylindrical in shape.

11. A head positioning apparatus according to claim 10 wherein the stator assembly is cylindrical in shape and includes a plurality of permanent magnets disposed symmetrically about an interior portion of the cylindrical shape of the stator assembly.

12. A head positioning apparatus according to claim 11 wherein the stator assembly includes a inner pole piece surrounding the magnet and shielding the magnetic head from magnetic fields generated by the magnet.

13. A head positioning apparatus according to claim 1 wherein the stationary detecting means includes first and second magnetic flux detectors positioned to respectively oppose north and south poles of the permanent magnet for detecting the comparative strengths of the respective magnetic flux fields coupled from respective ones of the north and south poles to the first and second magnetic flux detectors.

14. A head positioning apparatus according to claim 13 wherein the carriage position measuring means outputs a position indicating signal $V_P$ of the form:

$$V_P = (V_A - V_B)/(V_A + V_B) \tag{Eq. 1}$$

where $V_A$ and $V_B$ represent respective flux strength measurements of the first and second magnetic flux detectors.

15. A head positioning apparatus according to claim 13 wherein one or more of said magnetic flux detectors is a Hall effect device.

16. A head positioning apparatus according to claim 1 wherein said carriage position measuring means outputs a position measurement signal that is subject to error due to temperature variation, said apparatus further comprising:
(f) temperature correction means for measuring temperature, generating a temperature correction signal in response to the measured temperature, and combining the temperature correction signal with the position measurement signal to produce therefrom a temperature-compensated position indicating signal; and
(g) voice-coil drive means, responsive to the temperature-compensated position indicating signal, for driving a current through the voice-coil to apply a motive force to the voice-coil and thereby propel the attached carriage and head to a desired position.

17. A head positioning apparatus according to claim 16 wherein said temperature correction means includes:
temperature measurement means, attached to the carriage, for measuring temperature and for generating a temperature indicating signal in response to the measured temperature;
wherein the temperature measurement means is positioned operatively near to the carriage position measuring means for measuring a temperature of the carriage position measuring means.

18. A head positioning apparatus according to claim 1 wherein said movable carriage includes:
guide-rail engaging means for operatively engaging with the guide rail means such that the movable carriage will be guided along the predefined guide path;
wherein the guide-rail engaging means is positioned substantially at a center of gravity of the movable carriage.

19. A head positioning apparatus according to claim 18 wherein:
the guide rail means includes a fixed guide rail;
the guide-rail engaging means includes low-friction means for riding along the fixed guide rail with substantially small friction to thereby minimize a corresponding friction loading on the voice-coil when the voice coil propels the carriage; and
the low-friction means includes a first side portion and an opposed second side portion each engaging with the fixed guide rail, said first and second side portions being symmetrically disposed relative to the center of gravity of the carriage.

20. A head positioning apparatus according to claim 19 wherein the low-friction means includes a first plurality of low-friction roller wheels symmetrically engaged to the fixed guide rail.

21. A head positioning apparatus according to claim 20 wherein:
   the guide rail means includes a movable guide rail; and
   the low-friction means includes a second plurality of low-friction roller wheels symmetrically engaged to the movable guide rail.

22. A head positioning apparatus according to claim 19 wherein:
   the guide rail means includes a stationary member having a C-shaped first section; and
   the low-friction means includes a slide member having a C-shaped second section fitting symmetrically within the C-shaped first section.

23. A head positioning apparatus according to claim 22 wherein the C-shaped second section of the slide member applies resilient pressure against opposed inner walls of the C-shaped first section.

24. A head positioning apparatus according to claim 23 comprising a plurality of bearing balls disposed between the inner walls of the C-shaped first section and opposing outer walls of the C-shaped second section.

25. A head positioning apparatus according to claim 1 further comprising:
   (f) a substantially rigid frame on which said guide rail is positioned, said frame having a alignment feature formed thereon for engaging with the stator assembly and aligning the stator assembly relative to the guide rail means so as to define a prespecified spatial orientation between the stator assembly and the guide rail means.

26. A head positioning apparatus according to claim 25 wherein:
   the alignment feature is an integral part of the frame; and
   the stator assembly has a side portion abutted against the alignment feature and a base portion adhesively fastened to the frame.

27. A head positioning apparatus according to claim 25 wherein the guide rail means comprises:
   a fixed guide rail fixedly attached to the frame; and
   a movable guide rail, resiliently biased to move toward the fixed guide rail;
   and wherein the carriage includes:
      low-friction means for riding between the fixed guide rail and the movable guide rail with substantially small friction to thereby minimize a corresponding friction loading on the voice-coil when the voice coil propels the carriage and to thereby define said guide path.

28. A head positioning apparatus according to claim 1 further comprising:
   (f) latch means, positioned to operatively engage with said movable carriage and to be driven by a supplied tape cartridge, for allowing movement of the carriage when a tape cartridge supplied, and for inhibiting movement of the carriage when a tape cartridge is not supplied.

29. A head positioning apparatus according to claim 1 wherein said carriage is composed of a rigid material.

30. A voice-coil based positioning system comprising:
   (a) a movable voice-coil having a tubular shape, where said tubular shape includes inner and outer bounds;
   (b) a stator for generating a flux field passing through the voice-coil;
   (c) voice-coil drive means for delivering a current to the voice-coil to thereby generate a magnetic motive force that moves the voice-coil; and
   (d) position determining means for determining the position of the movable voice-coil, said position determining means having a movable first position determining means and a stationary second position determining means,
   (d.1) wherein the movable first position determining means includes a permanent magnet that is coupled to the movable voice-coil for moving with the voice-coil,
   (d.2) wherein the movable first position determining means is positioned within the inner bounds of the tubular shape of the voice-coil,
   (d.3) wherein the stationary second position determining means is positioned within a region that is bounded by a path traveled by the inner bounds of the tubular shape of the voice-coil; and
   (d.4) wherein the stationary second position determining means is operatively coupled to the movable first position determining means for detecting the position of the movable voice-coil relative to the stationary second position determining means.

31. A voice-coil based positioning system according to claim 30 wherein said position determining means outputs a position measurement signal that is subject to error due to temperature variation, said positioning system further comprising:
   (h) temperature measurement means, operatively coupled to the movable first position determining means, for measuring a temperature of the movable first position determining means and for generating a temperature indicating signal in response to the measured temperature; and
   (i) combining means for combining the temperature indicating signal with the position measurement signal to produce therefrom a temperature-compensated position indicating signal.

32. A voice-coil based positioning system according to claim 31
   wherein said voice-coil is coupled to a movable load that is to be moved to one of a plurality of predefined nominal load positions;
   wherein the combining means produces the temperature-compensated position indicating signal such that the position indicating signal indicates the position of the load; and
   wherein said voice-coil drive means comprises:
   (c.1) first input means for receiving a nominal load-position signal representing a desired nominal load position;
   (c.2) second input means for receiving said temperature-compensated position indicating signal from the combining means; and
   (c.3) servo means for adjusting the magnitude of the voice coil driving current so as to shift the measured load position represented by the temperature-compensated position indicating signal towards convergence with the desired load position represented by the nominal load-position signal.

33. A voice-coil based positioning system according to claim 32
   wherein said combining means includes a digital memory device having a plurality of addressable memory cells each storing a data word, wherein the digital memory device has an address input port and a data output port, wherein the address input port is responsive to the combination of the temperature indicating signal and the position measurement signal, and wherein the data words stored in the digital memory device are predefined to produce the temperature-compensated position indicating signal at said data output port.

34. A voice-coil based positioning system according to claim 30 wherein:

the movable first position determining means is located within an interior hollow defined by inner bounds of the tubular shape of the voice-coil; and the stationary second position determining means is positioned within to a region traversed by the interior hollow of the voice coil.

35. A voice-coil based positioning system according to claim 34 wherein the stator includes:

a U-shaped magnetic yoke through which flows the magnetic flux of the stator-generated flux field, the U-shaped magnetic yoke having an inner pole piece positioned in the region traversed by the interior hollow of the voice coil, and the U-shaped magnetic yoke further having an outer pole piece positioned outside the region traversed by the outer bounds of the tubular shape of the voice-coil as the voice coil moves.

36. A voice-coil based positioning system according to claim 35 wherein:

the inner pole piece has a tubular shape surrounded by the tubular shape of the voice coil.

37. A voice-coil based positioning system according to claim 36 wherein:

the outer pole piece has a tubular shape surrounding the tubular shape of the voice coil.

38. A voice-coil based positioning system according to claim 37 wherein the stator further includes:

a plurality of magnets distributed about the tubular shape of the voice coil for distributing said flux field uniformly about the voice-coil.

39. A voice-coil based positioning system according to claim 34 further comprising:

low-friction guide means, operatively coupled to the voice-coil, for guiding the voice coil along a guide path defined by a guide rail, said low-friction guide means riding along the guide rail with substantially small friction to thereby minimize a corresponding friction loading on the voice-coil as the voice coil moves along the guide path defined by said guide rail.

40. A voice-coil based positioning system comprising:

(a) a movable voice-coil having a tubular shape;

(b) a stator assembly for generating a flux field passing through the voice-coil;

(c) voice-coil drive means for driving a current through the voice-coil to thereby apply a motive force to the voice-coil and move the voice-coil;

(d) a movable magnet coupled to the movable voice-coil for moving with the voice-coil, said movable magnet being positioned within the tubular shape of the voice-coil;

(e) magnetic field sensing means positioned within a region bounded by a path of travel of the tubular shape of the voice-coil, the magnetic field sensing means having a Hall-effect device magnetically coupled to the movable magnet for detecting the position of the movable magnet relative to the magnetic field sensing means.

41. A method for making and calibrating a positioning system comprising the steps of:

(a) providing a voice coil reciprocally disposed in a magnetic stator structure, the voice coil moving relative to the stator structure in response to the application of electrical current through the voice coil;

(b) providing a programmable measurement means for measuring movement of the voice coil relative to the stator structure, said measurement means including a permanent magnet coupled to the voice coil, the output of the measurement means being defined by a programmable table look-up means included in the programmable measurement means;

(c) removably attaching a precision measurement means to the voice coil for precisely measuring the position of the voice coil relative to the stator structure;

(d) applying current to the voice coil to move the voice coil to a precision position as determined by the precision measurement means; and (e) programming the programmable table look-up means to output a signal representing said position while said current is applied to the voice coil.

42. A load positioning apparatus for providing coarse and fine positioning of a load, said apparatus comprising:

(a) a voice-coil having a hollow defined in an interior portion thereof;

(b) a stator assembly for generating a flux field passing through the voice-coil;

(c) a movable carriage supporting the voice coil and further adapted for supporting the load;

(d) a guide rail operatively coupled to the movable carriage for guiding the movable carriage along a predefined guide path that allows the carriage to carry the load to predefined positions and that further carries the voice-coil through the flux field generated by the stator assembly;

(e) a carriage position measuring mechanism for measuring the position of the carriage relative to a reference frame and outputting a corresponding measurement signal;

wherein the carriage position measuring mechanism includes:

(e.1) a first position measuring part coupled to the carriage so as to move with the carriage, said first position measuring part having a permanent magnet situated within the hollow of the voice-coil; and (e.2) a second position measuring part for magnetically detecting the position of the permanent magnet relative to the second position measuring part, the second position measuring part being situated in a region traversed by the hollow of the voice-coil; and (f) a coil driving circuit that is responsive to the measurement signal of the carriage position measuring mechanism and to supplied, coarse and fine position-control signals, the coil driving circuit outputting a responsive drive current to the voice-coil for respective coarse and fine positioning of said load.

43. A load positioning apparatus according to claim 42 wherein said permanent magnet includes Neodymium.

44. A load positioning apparatus according to claim 42 wherein said permanent magnet is of a low-weight, high-field strength formulation such as Neodymium.

45. A load positioning apparatus according to claim 42 wherein said second position measuring part includes a Hall-effect device for magnetically detecting a strength of magnetic field radiated by the permanent magnet.

46. A load positioning apparatus according to claim 42 wherein said second position measuring part includes a pair of opposed Hall-effect detectors for magnetically detecting strengths of opposingly-directed magnetic fields radiated by the permanent magnet.

47. A load positioning apparatus according to claim 46 wherein said carriage position measuring mechanism further includes:

(e.3) signal means for producing said measurement signal as a function of a difference between respective flux strength detections made respectively by the opposed Hall-effect detectors.

48. A load positioning apparatus according to claim 47 wherein:

(e.3a) said signal means is further for producing said measurement signal as a function of a reciprocal of a sum of the respective flux strength detections made respectively by the opposed Hall-effect detectors.

49. A load positioning apparatus according to claim 42 further comprising:

(g) a magnetic shield surrounding said permanent magnet and said second position measuring part.

50. A load positioning apparatus according to claim 42 further comprising:

(g) a nonmagnetic support bracket extending from the carriage to the permanent magnet and supporting the permanent magnet; and (h) a temperature measuring device operatively coupled to the support bracket for measuring the temperature of the support bracket and for producing a corresponding temperature indicating signal;

wherein the carriage position measuring mechanism is responsive to the temperature indicating signal for compensating for thermal expansion of the support bracket.

51. A load positioning apparatus according to claim 50 wherein the carriage position measuring mechanism includes a calibratable lookup means for defining the measurement signal as a function of said temperature indicating signal and as a function of said magnetic detecting by the second position measuring part.

* * * * *

UNITED STATES PATENT AND TRADEMARK OFFICE
CERTIFICATE OF CORRECTION

PATENT NO. : 5,901,008
DATED      : May 4, 1999
INVENTOR(S) : Ashok B. Nayak et al.

It is certified that error appears in the above-indentified patent and that said Letters Patent is hereby corrected as shown below:

Column 17, line 12, "claim 1" should be --claim 4--.

Signed and Sealed this

Thirty-first Day of August, 1999

Attest:

Q. TODD DICKINSON

*Attesting Officer*     *Acting Commissioner of Patents and Trademarks*